United States Patent [19]
Kashima

[11] Patent Number: 5,202,795
[45] Date of Patent: Apr. 13, 1993

[54] EYEPIECES

[75] Inventor: Shingo Kashima, Tokyo, Japan

[73] Assignee: Olympus Optical Co., Ltd., Tokyo, Japan

[21] Appl. No.: 781,993

[22] Filed: Oct. 22, 1991

[30] Foreign Application Priority Data

Oct. 23, 1990 [JP] Japan .................................. 2-285247

[51] Int. Cl.$^5$ ...................... G02B 25/00; G02B 13/18; G02B 9/12; G02B 9/14
[52] U.S. Cl. .................................... 359/645; 359/716; 359/784; 359/786; 359/788
[58] Field of Search ............... 359/643, 644, 645, 786, 359/788, 784, 716

[56] References Cited

U.S. PATENT DOCUMENTS 2,394,635  2/1946  Reiss ..................................... 359/645
4,094,585  6/1978  Betensky ............................. 359/717

FOREIGN PATENT DOCUMENTS 62-255914  11/1987  Japan .
63-318514  12/1988  Japan .

Primary Examiner—Scott J. Sugarman
Attorney, Agent, or Firm—Cushman, Darby & Cushman

[57] ABSTRACT

The invention relates to an eyepiece that has an improved image surface flatness even at a wider field angle, is well corrected for various aberrations inclusive chromatic aberration of pupil and is usable with inexpensive microscopes (esp., stereoscopic ones). The eyepiece of the invention is an eyepiece including at least three lens components comprising a cemented lens component consisting positive and negative lens elements and a lens component having a negative refractive power in its entirety, characterized in that the lens component other than the lens components proximate to the object and eye sides is provided with a plastic lens element or elements having at least one aspherical surface.

12 Claims, 3 Drawing Sheets

EYEPIECES

BACKGROUND OF THE INVENTION

1. Field of the Invention

The present invention relates to an eyepiece used with microscopes (esp., stereoscopic ones), etc. and, more particularly, to an eyepiece that is inexpensive and has an improved image surface flatness.

2. Description of the Related Art

Eyepieces similar to that disclosed herein and known in the art, for instance, are set forth in JP-A-63(1988)-318514 and 62(1987)-255914, the former made up of three lens groups, each consisting of three lens elements, at least one of which is formed of a plastic lens having an aspherical surface, and the latter mainly made up of two lens groups, each consisting of three lens elements, at least one surface of which is aspherical.

These conventional eyepieces have some drawbacks; the former, comprising three lens components, is less than satisfactory in terms of the correction of pupil and chromatic aberrations (esp., chromatic aberration of pupil) for lack of any cemented surface, and the latter is still insufficient in terms of the flatness of the image surface when the field angle is further widened.

SUMMARY OF THE INVENTION

Taking the above into consideration this invention seeks to provide an eyepiece that has an improved image surface flatness at a wider field angle, allows satisfactory correction of various aberrations inclusive chromatic aberration of pupil and is inexpensive.

More specifically, this invention provides an eyepiece including at least three lens components comprising a cemented lens component having positive and negative lens elements and a lens component having a negative refractive power in its entirety, characterized in that the lens component or components except the lens components proximate to the object and eye sides is or are provided with a plastic lens element or elements having at least one aspherical surface.

In this invention, it is essentially desired that the aspherical surface be represented by the following equation Z, satisfying the following condition:

$$Z = (y^2/r)/[1 + \{1 - (1 + k)(y^2/r^2)\}^{\frac{1}{2}}] + A_4 y^4 + A_6 y^6 + A_8 y^8 + A_{10} y^{10}$$
$$0.005 < |dZ/h| < 0.05 \tag{1}$$

wherein:
- Z is the distance measured from the vertex of the aspherical surface along the optical axis,
- y is the distance measured from the vertex in the direction normal to the optical axis,
- r is the radius of curvature of the vertex (curvature of the reference surface),
- k is the conical coefficient,
- $A_4$, $A_6$, $A_8$ and $A_{10}$ are the aspherical coefficients of the 4th, 6th, 8th and 10th orders, respectively,
- dZ is the departure from the reference surface of the aspherical surface measured along the optical axis at the incident point of the off-axial principal ray of maximum image height, and
- h is the distance from the incident point of the off-axial principal ray of maximum image height to the optical axis.

Moreover, the eyepiece of this invention includes a lens element having a strong negative refractive power, and the focal length f thereof should desirably meet the following condition:

$$1 < |f/f_a| < 10 \tag{2}$$

wherein $f_a$ is the focal length of the entire eyepiece system.

The eyepiece of this invention may be made up of, in order from the incident side of light, a negative meniscus lens with the convex surface facing the incident side, a positive lens and a cemented lens consisting of positive and negative lens elements, said single positive lens being formed of a plastic lens having an aspherical surface on the exit side.

Alternatively, the eyepiece of this invention may be made up of, in order from the incident side of light, a positive meniscus lens concave on the incident side, a negative meniscus lens concave on the incident side and a cemented positive lens consisting of positive and negative lens elements, said negative meniscus lens being formed of a plastic lens having an aspherical surface on the incident side.

Further, the eyepiece of this invention may be made up of, in order from the incident side of light, a positive meniscus lens concave on the incident side, a negative meniscus lens convex on the incident side and a cemented positive lens consisting of positive and negative lens elements, said negative meniscus lens being formed of a plastic lens having an aspherical surface on the exit side.

Still further, the eyepiece of this invention may be made up of, in order from the incident side of light, a cemented positive lens consisting of negative and positive lens elements, a negative meniscus lens concave on the incident side and a positive lens, said negative meniscus lens being formed of a plastic lens having an aspherical surface on the incident side.

In order to assure the flatness of the image surface at an field angle wider than 40°, it is required to diminish the Petzval's sum, thereby diminishing the curvature of field. Because an eyepiece has a strong positive power on the whole, however, the overall Petzval's sum is likely to be so increased that the curvature of field is increased. According to this invention, the overall Petzval's sum can be diminished by allowing one of the three components to have a strong negative power to bring about a large negative Petzval's sum. At this time, it is noted that the focal length f of that lens having a strong negative power should desirably meet the following condition:

$$1 > |f/f_a| < 10 \tag{2}$$

wherein $f_a$ is the focal length of the overall eyepiece system.

At less than the lower limit—1—of Condition (2), the negative power of that lens is too strong to correct coma and pupil aberrations occurring there even with the remaining two components and the aspherical surface. At more than the upper limit of 10, no sufficiently strong negative power is achieved, only to fail to diminish the Petzval's sum of the overall system.

It is here noted that at a wider field angle the angular aperture is so increased when using the pupil as the object point that large pupil aberrations occur. However, they can be corrected by using an aspherical surface. Moreover, in order to allow satisfactory correction of comae occurring through the lens having a strong negative power, the aspherical surface should be represented by Equation Z, satisfying Condition (1), as already stated.

At less than the lower limit—0.005—of Condition (1), the aspherical surface is less effective, so that positive pupil aberrations occurring through the spherical system cannot be compensated for by those occurring through the aspherical portion, resulting in a failure in correcting pupil aberrations well. Nor can any meridional image surface be set up. Also, at greater than the upper limit of 0.05, on the contrary, negative pupil aberrations occurring through the aspherical surface are too large to set off them by the spherical system. In addition, the meridional image surface is so disturbed that any satisfactory correction can never be achieved. This is especially true of conventional microscopes and stereoscopic ones. It is understood that at more than this upper limit the sagittal image surface is largely tilting down, but this can be compensated or by an objective or a zoom system of a stereoscopic microscope, enabling the image surface to be made flat as a whole. Thus, no significant problem arises in connection with the sagittal image surface.

Referring here to the layout of the lenses, it is desired that at least one component be a cemented lens consisting of positive and negative lenses because there is need for enabling chromatic aberrations (inclusive of chromatic aberration of pupil) to be corrected substantially. The use of a lens having a strong negative power results in an increase in the number of lenses involved. In order to render the eyepiece inexpensive, it is thus required to construct a lens having an aspherical surface with plastics. However, because plastics are likely to have flaws, a plastic lens element must be sandwiched between glass lens elements. Imperatively enough, this requires for a component or components other than the first and final component to be formed of a plastic lens or lenses.

Still other objects and advantages of the invention will be in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 2:
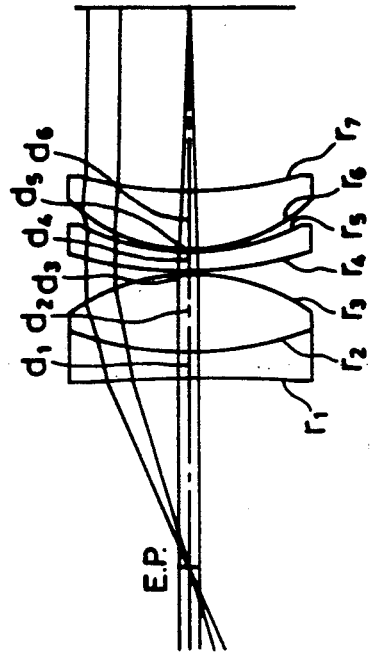
FIGS. 1 to 4 are sectional views of Examples 1 to 4 of the eyepiece of this invention.
Figure 4:
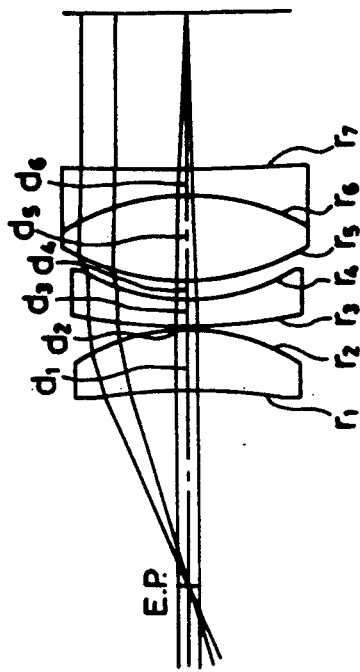
Figure 1:
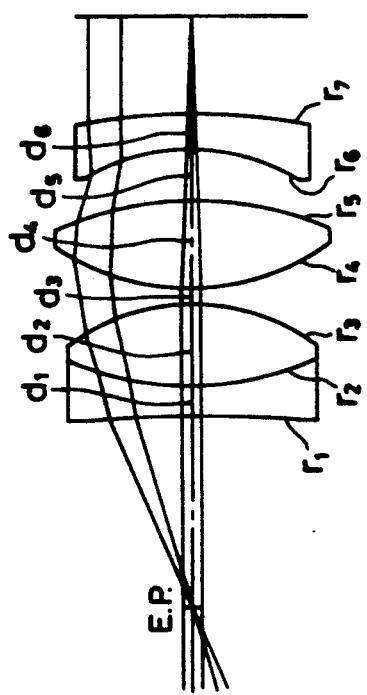
Figure 3:
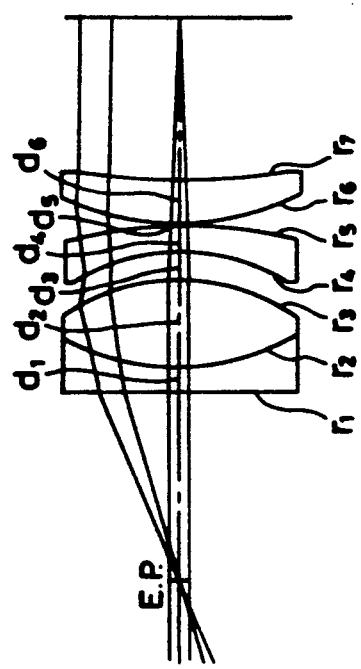

The eyepiece of this invention will now be explained more illustratively, but not exclusively, with reference to Examples 1 to 4, as illustrated in FIGS. 1 to 4. In Example 1, the eyepiece is made up of a cemented lens, a plastic positive lens and a single lens having a strong negative power, as viewed from the eye side. In Example 2 or 3, the eyepiece is made up of a cemented lens, a plastic lens having a strong negative power and a single positive lens, as viewed from the eye side; and in Example 4, the eyepiece is made up of a single positive lens, a plastic lens having a strong negative power and a cemented lens, as viewed from the eye side. In Example 1 or 3, the aspherical surface is located on the eye side of the second lens component; and in Example 2 or 4, it is located on the object side of the second lens component. NB. E.P. stands for the position of the exit pupil. Although the lens data of the respective examples are set out below, it is understood that the lens surfaces are designated in the order reverse to the progress of rays. Other symbols or abbreviations represent: $F_{NO}$ .. the F number, $\omega$ ... the half-field angle, $r_1, r_2, \ldots$ the radii of curvature of the respective lens surfaces, $d_1, d_2, \ldots$ the surface separations between the adjacent lens surfaces, $n_{d1}, n_{d2}, \ldots$ the refractive indices for d-line of the respective lenses, $\nu_{d1}, \nu_{d2}, \ldots$ the Abbe's numbers of the respective lenses, and PTZ ... the Petzval's sum.

EXAMPLE 1

$f_a = 25$
$F_{NO} = 12.5$
$\omega = 23.72°$

| | | |
|---|---|---|
| $r_1 = -144.067$ | $d_1 = 3.00$  $n_{d1} = 1.847$ | $\nu_{d1} = 23.8$ |
| $r_2 = 31.071$ | $d_2 = 8.70$  $n_{d2} = 1.697$ | $\nu_{d2} = 48.5$ |
| $r_3 = -22.787$ | $d_3 = 1.73$ | |
| $r_4 = 26.754$ (Aspheric) | $d_4 = 9.31$  $n_{d3} = 1.492$ (plastics) | $\nu_{d3} = 57.5$ |
| $r_5 = -36.367$ | $d_5 = 5.31$ | |
| $r_6 = -19.448$ | $d_6 = 3.50$  $n_{d4} = 1.620$ | $\nu_{d4} = 36.3$ |
| $r_7 = -54.844$ | | |

Aspherical Coefficients
4th surface $k = -0.1620$
$A_4 = 0.3367 \times 10^{-5}$
$A_6 = 0.1277 \times 10^{-7}$
$A_8 = 0.6806 \times 10^{-10}$
$A_{10} = 0.1690 \times 10^{-13}$
$|dZ/h| = 0.013$
$f/f_a = 2.02$
PTZ $= 0.022$

EXAMPLE 2

$f_a = 25$
$F_{NO} = 12.5$
$\omega = 23.73°$

| | | |
|---|---|---|
| $r_1 = -175.245$ | $d_1 = 2.50$  $n_{d1} = 1.847$ | $\nu_{d1} = 23.8$ |
| $r_2 = 31.053$ | $d_2 = 8.86$  $n_{d2} = 1.744$ | $\nu_{d2} = 44.8$ |
| $r_3 = -20.160$ | $d_3 = 0.20$ | |
| $r_4 = 48.185$ | $d_4 = 2.00$  $n_{d3} = 1.584$ (plastics) | $\nu_{d3} = 30.8$ |
| $r_5 = 28.467$ (Aspheric) | $d_5 = 0.43$ | |
| $r_6 = 18.618$ | $d_6 = 6.00$  $n_{d4} = 1.518$ | $\nu_{d4} = 65.0$ |
| $r_7 = 40.001$ | | |

Aspherical Coefficients
5th surface $k = 0.6207$
$A_4 = 0.1136 \times 10^{-4}$
$A_6 = 0.6664 \times 10^{-7}$
$A_8 = -0.2556 \times 10^{-9}$
$A_{10} = 0.1658 \times 10^{-11}$
$|dZ/h| = 0.03$
$f/f_a = 4.95$
PTZ $= 0.022$

EXAMPLE 3

$f_a = 25$
$F_{NO} = 12.5$
$\omega = 23.72°$

| | | |
|---|---|---|
| $r_1 = -5702.378$ | $d_1 = 2.50$  $n_{d1} = 1.847$ | $\nu_{d1} = 23.8$ |
| $r_2 = 22.355$ | $d_2 = 9.44$  $n_{d2} = 1.833$ | $\nu_{d2} = 40.8$ |
| $r_3 = -20.633$ | $d_3 = 2.98$ | |
| $r_4 = -22.144$ (Aspheric) | $d_4 = 2.50$  $n_{d3} = 1.584$ (plastics) | $\nu_{d3} = 30.8$ |
| $r_5 = -55.879$ | $d_5 = 0.20$ | |
| $r_6 = 34.189$ | $d_6 = 4.62$  $n_{d4} = 1.617$ | $\nu_{d4} = 62.8$ |
| $r_7 = 90.374$ | | |

-continued

Aspherical Coefficients
4th surface k = 0.6747
$A_4 = -0.6004 \times 10^{-5}$
$A_6 = -0.6776 \times 10^{-7}$
$A_8 = 0.5394 \times 10^{-9}$
$A_{10} = -0.2893 \times 10^{-11}$
| dZ/h | 0.025
$f/f_a$ = 2.58
PTZ = 0.02

EXAMPLE 4

$f_a = 25$
$F_{NO} = 12.5$
$\omega = 23.72°$

| | | |
|---|---|---|
| $r_1 = -75.000$ | $d_1 = 6.83$   $n_{d1} = 1.773$ | $\nu_{d1} = 49.6$ |
| $r_2 = -20.633$ | $d_2 = 0.20$ | |
| $r_3 = 71.072$ | $d_3 = 2.50$   $n_{d2} = 1.584$ (plastics) | $\nu_{d2} = 30.8$ |
| $r_4 = 21.415$ (Aspheric) | $d_4 = 2.03$ | |
| $r_5 = 24.087$ | $d_5 = 9.30$   $n_{d3} = 1.816$ | $\nu_{d3} = 46.6$ |
| $r_6 = -25.038$ | $d_6 = 2.65$   $n_{d4} = 1.847$ | $\nu_{d4} = 23.8$ |
| $r_7 = 292.391$ | | |

Aspherical Coefficients
4th surface k = −0.2249
$A_4 = 0.1009 \times 10^{-4}$
$A_6 = 0.1795 \times 10^{-7}$
$A_8 = 0.2889 \times 10^{-10}$
$A_{10} = 0.6709 \times 10^{-13}$
| dZ/h | = 0.011
$f/f_a$ = 2.14
PTZ = 0.02

Figure 5:
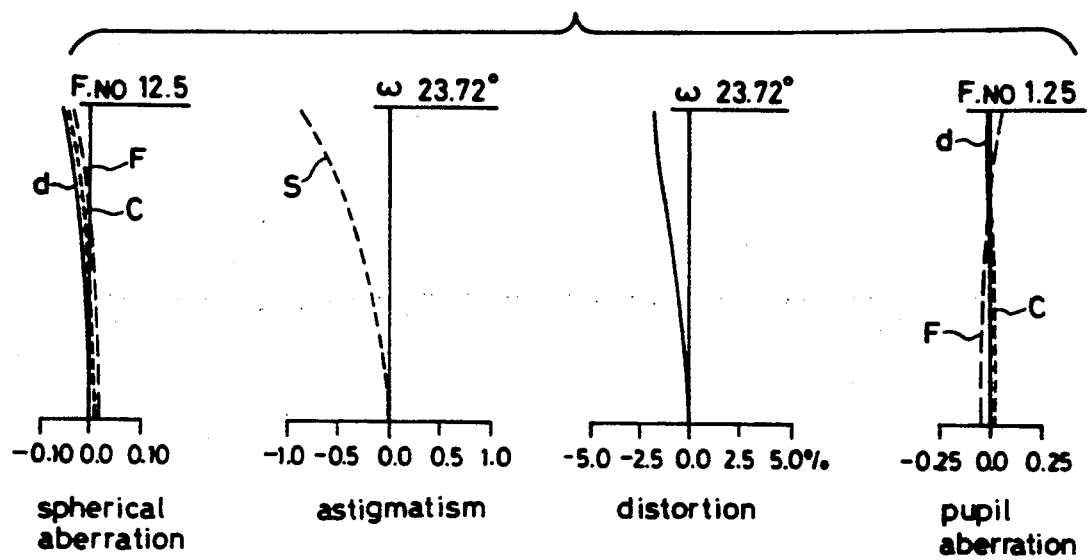
FIGS. 5 to 8 are aberrational diagrams of Examples 1 to 4.
Figure 6:
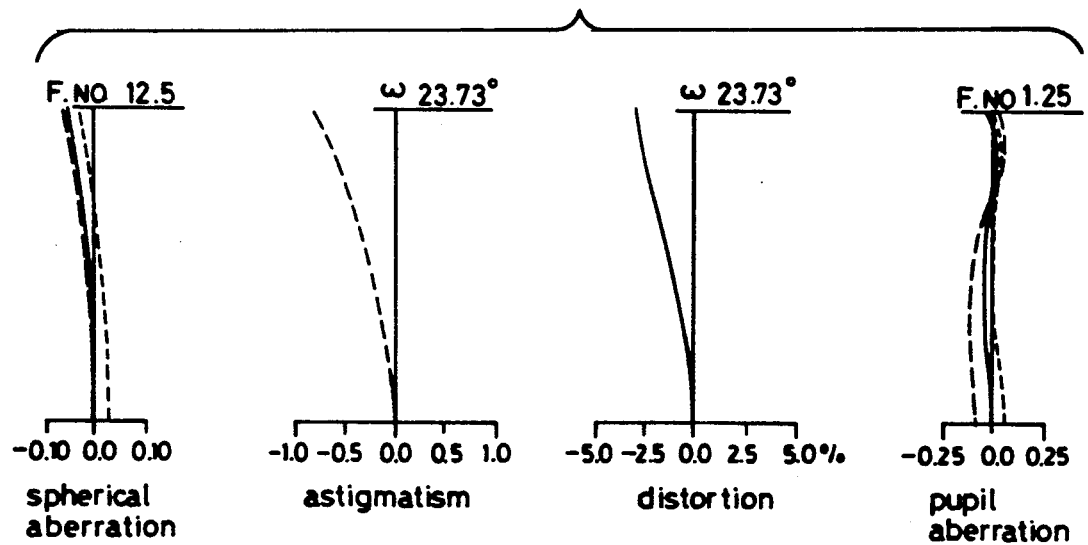
Figure 7:
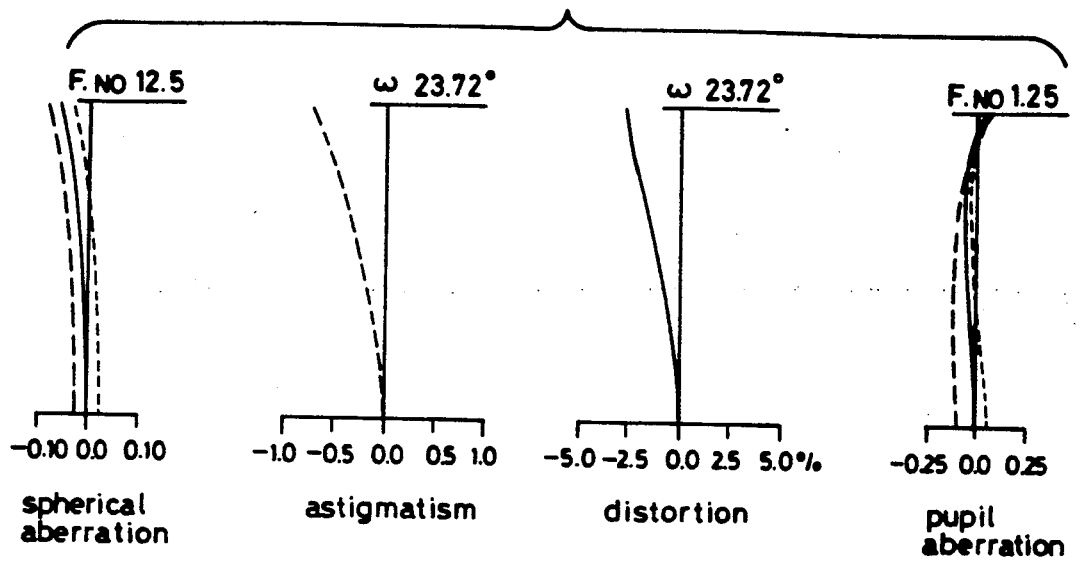
Figure 8:
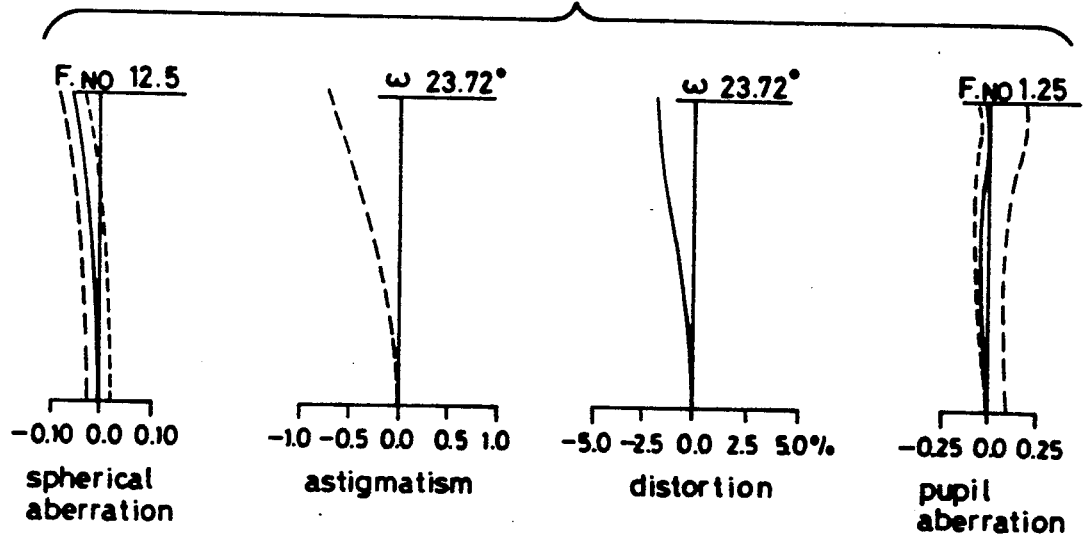

The aberrational diagrams of Examples 1 to 4 are shown in FIGS. 5 to 8.

According to this invention, it is possible to obtain a inexpensive eyepiece comprising at least three lens components, which has a diminished Petzval's sum in its entirety and an improved image surface flatness at an field angle of 40° or more and enables pupil aberrations inclusive chromatic aberration to be corrected substantially.

What is claimed is:

1. An eyepiece comprising three lens components including a cemented doublet consisting of positive and negative lens elements and a negative lens component, characterized in that the lens component except the lens components proximate to the object and eye sides is provided with a plastic lens element having at least one aspherical surface.

2. An eyepiece as claimed in claim 1, said aspherical surface being represented by the following equation Z:

$$Z=(y^2/r)/[1+\{1-(1+k)(y^2/r^2)\}^{\frac{1}{2}}]+A_4y^4+A_6y^6+A_8y^8+A_{10}y^{10}$$

and satisfying the following condition:

$$0.005<|dZ/h|<0.05$$

wherein:
Z is the distance measured from the vertex of the aspherical surface along the optical axis,
Y is the distance measured from the vertex in the direction normal to the optical axis,
r is the radius of curvature of the vertex (curvature of the reference surface),
k is the conical coefficient, $A_4$, $A_6$, $A_8$ and $A_{10}$ are the aspherical coefficients of the 4th, 6th, 8th, and 10th orders, respectively,
dZ is the departure from the reference sphere of the aspherical surface measured along the optical axis at the incident point of the off-axial principal ray of maximum image height, and
h is the distance from the incident point of the off-axial principal ray of maximum image height to the optical axis.

3. An eyepiece as claimed in claim 1, the focal length f of the negative lens component meeting the following condition:

$$1<|f/f_a|<10$$

wherein $f_a$ is the focal length of the entire eyepiece system.

4. An eyepiece comprising:
a negative meniscus lens having a convex surface facing an incident light;
a cemented lens consisting of positive and negative lens elements; and
a positive lens, disposed between the negative meniscus lens and the cemented lens, formed of a plastic lens having an aspherical surface facing the cemented lens,
the incident light passing through the negative meniscus lens before passing through the positive lens and the cemented positive lens.

5. An eyepiece comprising:
a positive meniscus lens having a concave surface facing an incident light;
a cemented positive lens consisting of positive and negative lens elements; and
a negative meniscus lens, disposed between the positive meniscus lens and the cemented lens, formed of a plastic lens having a concave aspherical surface facing the positive meniscus lens,
the incident light passing through the positive meniscus lens before passing through the negative meniscus lens and the cemented lens.

6. An eyepiece comprising:
a positive meniscus lens having a concave surface facing an incident light;
a cemented positive lens consisting of positive and negative lens elements; and
a negative meniscus lens, disposed between the positive meniscus lens and the cemented lens, formed of a plastic lens having an aspherical surface facing the cemented lens and a convex surface facing the positive meniscus lens,
the incident light passing through the positive meniscus lens before passing through the negative meniscus lens and the cemented positive lens.

7. An eyepiece comprising:
a cemented positive lens consisting of negative and positive lens elements;
a positive lens; and
a negative meniscus lens, disposed between the cemented positive lens and the positive lens, formed of a plastic lens having a concave aspherical surface facing the cemented positive lens,
incident light passing through the positive cemented lens before passing through the negative meniscus lens and the positive lens.

8. An eye piece comprising:
a first lens component comprising a cemented lens consisting of positive and negative lens elements;

a second lens component having negative refractive power in its entirety; and a third lens component, disposed between the first and second lens components, comprising a plastic lens element having at least one aspherical surface.

9. An eyepiece as claimed in claim 8, said aspherical surface being represented by the following equation Z:

$$Z = (y^2/r)/[1 + \{1 - (1+k)(y^2/r^2)\}^{\frac{1}{2}}] + A_4 y^4 + A_6 y^6 + A_8 y^8 + A_{10} y^{10}$$

and satisfying the following condition:

$$0.005 < |dZ/h| < 0.05$$

wherein:
- Z is the distance measured from the vertex of the aspherical surface along the optical axis,
- Y is the distance measured from the vertex in the direction normal to the optical axis,
- r is the radius of curvature of the vertex (curvature of the reference surface),
- k is the conical coefficient,
- $A_4$, $A_6$, $A_8$ and $A_{10}$ are the aspherical coefficients of the 4th, 6th, 8th and 10th orders, respectively,
- dZ is the departure from the reference sphere of the aspherical surface measured along the optical axis at the incident point of the off-axial principal ray of maximum image height, and
- h is the distance from the incident point of the off-axial principal ray of maximum image height to the optical axis.

10. An eyepiece as claimed in claim 8, the focal length f of the second lens component meeting the following condition:

$$1 < |f/f_a| < 10$$

wherein $f_a$ is the focal length of the entire eyepiece system.

11. An eyepiece comprising:
a first lens component comprising a cemented lens consisting of positive and negative lens elements;
a second lens component having one of positive refractive power and negative refractive power in its entirety; and
a third lens component, disposed between the first and second lens components, comprising a plastic lens element, the third lens component having negative refractive power when the second lens component has positive refractive power and positive refractive power when the second lens component has negative refractive power in its entirety.

12. An eyepiece as claimed in claim 11, the third lens component having an aspherical surface.

* * * * *